SELF ENERGIZING BELT DRIVE CLUTCH ASSEMBLY
Filed Aug. 29, 1956
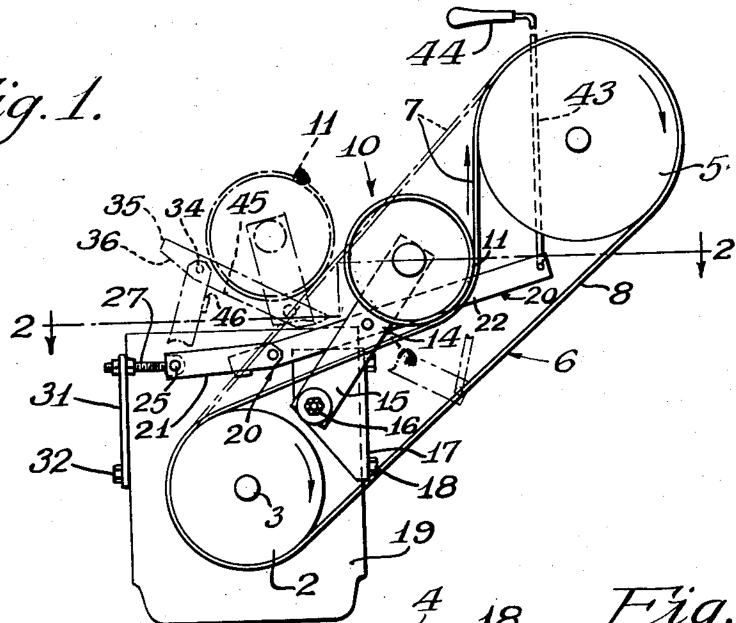
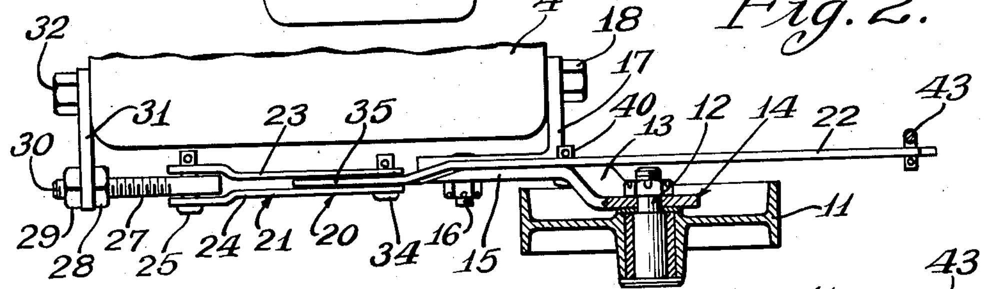
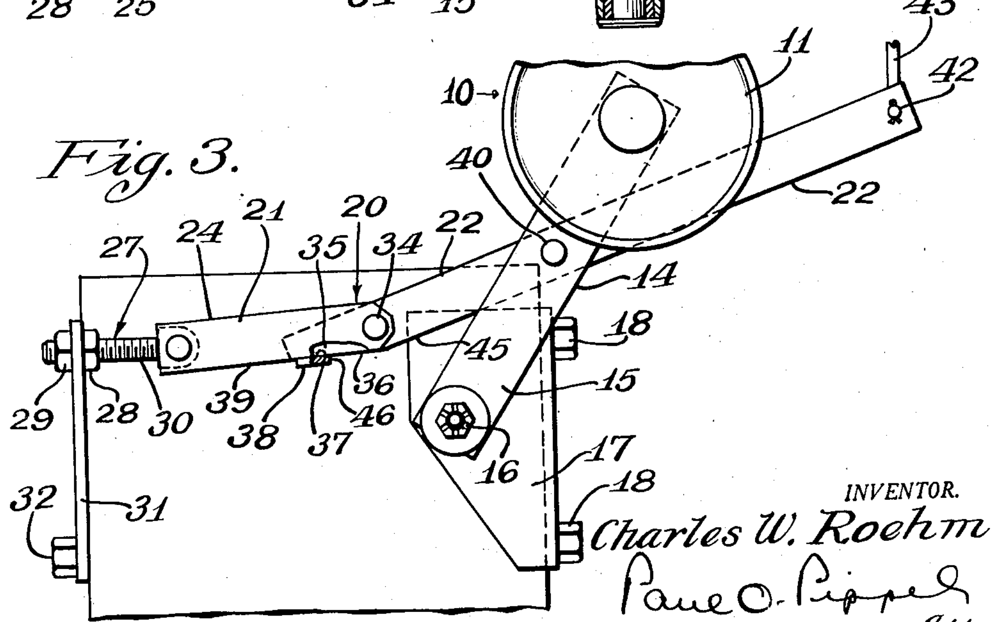
INVENTOR.
Charles W. Roehm
Paul O. Pippel
Atty.

United States Patent Office 2,888,829
Patented June 2, 1959

2,888,829

SELF ENERGIZING BELT DRIVE CLUTCH ASSEMBLY

Charles W. Roehm, Memphis, Tenn., assignor to International Harvester Company, a corporation of New Jersey Application August 29, 1956, Serial No. 606,891

9 Claims. (Cl. 74—242.1)

This invention relates to belt drives and more specifically to a novel clutch arrangement therefor.

A general object of the invention is to provide a novel belt drive transmission incorporating a clutch in the form of a belt tightner which functions to tighten the belt and which has a self-locking position for holding the belt in driving position.

A more specific object of the invention is to provide a novel linkage for supporting the belt tightner formed and arranged to afford a self energizing action in that the act of engaging the idler with the belt serves to augment the manual actuation of the linkage whereby the tightner is urged into its engaged position.

These and other objects of the invention will become more apparent from the specification and the drawings, wherein:

Figure 1 is a side elevational view of the invention illustrated in full lines in its energized or its operative position, and in dotted lines in its inoperative position;

Figure 2 is a sectional view taken substantially on the line 2—2 of Figure 1; and Figure 3 is an enlarged side elevational view showing the structure in engaged position.

Describing the invention in detail, there is shown in the present instance a driving pulley 2 which is connected to an output shaft 3 of a tractor or other prime mover 4. The pulley 2 drives a driven member or pulley 5 by a belt 6 which has return and driving runs 7 and 8, respectively, the pulley 2 rotating in a clockwise direction as shown by the arrow in Figure 1.

The belt is tightened or loosened by a clutch arrangement generally indicated 10 which comprises an idler wheel 11 rotatably supported as on shaft 12 on the free end 13 of an arm 14 which has a fixed end 15 pivoted as at 16 to a mounting or support bracket 17 suitably connected as by bolts 18 to the support structure or body 19 of the tractor or prime mover.

The idler wheel 11 is disposed outwardly of the return run 7 and is actuated into engaging and disengaging position with respect to the run by means of a toggle linkage 20 which comprises first and second link members 21 and 22, the link member 21 being constituted of a pair of elements 23 and 24 which are pivoted at one of their ends or distal ends as at 25 on a fixed pivot carried by an adjusting means 27 in the form of a threaded eye bolt which is releasably held in place by means of a pair of opposed nuts 28 and 29 threaded on the bolt shank 30 which passes through an aperture in a support bracket 31 suitably mounted as by studs 32 on the support structure 19. The other or inner ends of the link elements 23 and 24 are pivoted as at 34 to the link member 22 intermediate its ends adjacent to one end thereof, said lever 22 having an inner end portion 35 extending between and being flanked by the elements 23 and 24 and having a lower edge 36 which is diagonal with respect to the longitudinal median line or neutral axis of the member 22 and adapted to seat as at 37 on a stop member 38 which is fixed as by welding to the under edges 39 of the members 23 and 24 to limit swinging movement of the element 22 in a direction moving the end portion 35 downwardly. The link 22 is pivotally connected intermediate its ends as at 40 to the arm 14 intermediate its ends, that is substantially medially thereof, and at its opposite end is pivotally connected as at 42 to the lower end of an operating rod 43 which may be provided at its upper end with an operating handle 44.

Assuming that the parts are in operating position as shown in Figure 1 wherein the wheel 11 is engaged with the outer side of the run 7 of the belt 6 whereby the belt is tightened and drive is being transmitted from the pulley 2 to the pulley 5, in order to declutch or interrupt the drive the operator moves the operating handle and rod 44, 43 downwardly whereby pivoting the link 22 about the pivot 40. This has the effect of raising the point 34 upwardly above the dead-center position of the points 25, 34 and 40 and immediately after the dead-center position is passed the linkage 21, 22 jackknives or breaks about the point 34 with attendant pivoting of the element 21 about the pivot point 25 whereby the element 21 swings upwardly and thus pulls on the element 22 which in turn swings the arm 14 upwardly thus disengaging the pulley 11 from the belt whereupon the downward movement of the rod is continued until the action is stopped by abutment of the lower edge 45 of the arm portion outwardly of the pivot 34 with the opposed edge 46 with the stop 38 on the toggle member 39.

In order to re-engage or re-establish the drive the handle 44 is moved upwardly which in turn moves the rod 43 upwardly and in turn swings the arm 14 downwardly while at the same time swinging the toggle members 21 and 22 downwardly about the point 25. After the idler wheel 11 engages the belt, the direction of rotation of the idler wheel tends to further pull the entire idler clutch structure toward the driven pulley which is disposed slightly to one side and above the idler and above at one side of the driving pulley, whereby the toggle linkage attempts to straighten out and continued pull on the rod causes the toggle to pass dead-center position to its locked position as shown in Figure 1 whereat the edge 36 of the end portion 35 of the link 22 engages as at 37 with the stop 38. Thus the idler is locked in position to maintain the belt tight.

Thus it will be appreciated that a novel and inexpensive and effective self-locking energizing mounting for the idler is provided and that adjustment of the entire assembly is effected by adjusting the position of the toggle linkage by means of the adjusting assembly 27.

What is claimed is:

1. The combination of a driving pulley and a driven pulley and a drive transmission belt trained thereabout and having advance and return runs and an idler positioned at said return run to tighten and loosen the belt, means for mounting said idler including a support, an arm rotatably mounting said idler at one end and pivoted at the other end on the support for swinging movement toward and away with respect to said return run of said belt, and operating means for said arm comprising a toggle having first and second link means pivotally interconnected adjacent to one of their ends, mounting means for said first link means pivotally mounting the same at its other end from the support, means pivotally connecting said second link means intermediate its ends with said arm intermediate its ends, and means for actuating said toggle connected to the other end of said second link means.

2. The invention according to claim 1 and means on the adjacent ends of said link means for limiting pivotal movement therebetween in a direction toward the belt in a position slightly past dead center of said first and second link means.

3. The invention according to claim 2 and said mounting means comprising parts adjustable toward and away with respect to said belt for changing the position of the pivot of the toggle with respect to said belt.

4. Driving and driven wheels, support means mounting the same, a belt loosely trained about said driving and driven wheels, and means for tightening and loosening the belt comprising an arm pivoted on said support means on an axis transverse to the plane of the belt and an idler wheel rotatably supported on the arm without the belt and swingable against and away with respect to the belt, a toggle having a pair of links interconnected at adjacent ends on an axis parallel to that of the arm, and one of the links pivoted on a fixed axis at its other end on said support means, means for swinging said toggle toward and away from the belt connected to said other link, and means pivotally connecting the arm with said other link, said toggle extending in the locked position thereof transversely of the belt.

5. The invention according to claim 4 and interengaging means on said links for limiting jackknifing movement therebetween in a direction toward said belt and locking the same past dead center position thereof.

6. A self energized belt tightener for engagement with a run of a belt passing therebeneath and moving in one direction comprising a member disposed in vertical alinement with said run for engagement therewith, an arm mounting said member, means pivotally supporting the arm for swinging movement toward and away from the belt for engaging and disengaging the member with respect thereto, a toggle extending in engaged position of said member lengthwise in the direction of movement of the belt run and pivoted at one end on a fixed axis, an operator connected to the other end of the toggle, and means pivotally connecting said toggle with said arm.

7. The invention according to claim 6 and said toggle including first and second links pivotally interconnected at a point intermediate said last-mentioned means and said one end.

8. The invention according to claim 7 and said toggle including a portion on said second link overlapping said first link, a stop on said first link beneath said portion, and an abutment surface on said portion extending diagonally upwardly in a direction away from the pivot between said links for stopping pivotal movement therebetween slightly below dead center position of said links.

9. A drive arrangement comprising driving and driven wheels and said driven wheel positioned above and to one side of said driving wheel and a belt loosely trained about said wheels and having return and driving runs extending diagonally upwardly from the driving to the driven wheel, a support mounting said wheels, an arm having a lower end pivotally supported between the wheels on the support at a point below said return run and having an upper end extending above said return run, an idler wheel rotatably supported on the upper end of the arm above said belt, operating means for the arm comprising first and second links disposed in end to end relation and pivotally interconnected at adjacent ends, means pivotally mounting the first link at its other end at a point above said driving wheel, said links extending generally lengthwise of said return run, said second link pivotally connected intermediate its ends to said arm intermediate its ends, and means on said links for limiting pivotal movement therebetween downwardly and holding the same in a position slightly below dead center.

References Cited in the file of this patent

UNITED STATES PATENTS

| | | |
|---|---|---|
| 2,505,277 | Ciaccio | Apr. 25, 1950 |
| 2,540,894 | Krause | Feb. 6, 1951 |
| 2,544,774 | Bredl et al. | Mar. 13, 1951 |
| 2,770,338 | Penney | Nov. 13, 1956 |